Aug. 27, 1957 R. W. PRESSING ET AL 2,804,271
WAX STRIPPER
Filed Dec. 9, 1954 3 Sheets-Sheet 3

INVENTORS
ROBERT W. PRESSING &
ALBERT W. LAVERS
BY Joseph T. Kivlin, Jr.
ATTORNEY

United States Patent Office 2,804,271
Patented Aug. 27, 1957

2,804,271

WAX STRIPPER

Robert W. Pressing, Racine, Wis., and Albert W. Lavers, Chicago, Ill., assignors to S. C. Johnson & Son, Inc., Racine, Wis.

Application December 9, 1954, Serial No. 474,131

6 Claims. (Cl. 241—30)

This invention relates to the stripping of wax powder from wax-producing vegetation. More specifically, it relates to a novel method and apparatus to extract wax from wax-containing vegetation.

Many vegetables waxes, such as ouricury, carnauba and candelilla wax, are removed from the plants by a variety of methods and apparatus. The removal process usually involves a series of various mechanical operations, frequently followed by chemical extraction. Normally, each series is expediently operable upon only a single wax species. When the wax powder is removed from the plants, a considerable amount of undesirable vegetable matter is also removed, and, intermingling with the wax powder, increases the problems of subsequent mechanical and chemical purification.

Prior to about 1946, virtually all the carnauba wax produced in Brazil came from the processing of powder which had been removed from the leaf by manual methods. As consumption of carnauba increased after World War II and the price rose rapidly, considerable interest developed in mechanical methods of increasing the speed of wax removal from the leaf and increasing the yield of powder per leaf. The machines most widely accepted were the cyclone and Guarani machines, which by 1949–50 were widely used in most of the carnauba-producing areas. Both of these machines operate on a principle of cutting the leaves into pieces about 1½ inches long and passing the pieces into a hammer mill section which beats the wax off the leaf. The wax powder is pulled by an exhaust fan into a collection chamber, and the leafy pieces are discharged from the bottom of the hammer mill section.

The cutting and beating action of these machines tends to break off leafy particles to a much greater degree than does manual beating. This results in a greater concentration of leafy matter in the crude powder, complicating further processing to obtain the finished wax. The reduced leaf processing costs overcame this objection, however, so that the machine achieved general acceptance. At present, probably 90% or more of carnauba produced in Brazil comes from cyclone-beaten leaves.

It is, therefore, the primary object of this invention to provide a method and apparatus to adequately extract wax from wax-containing vegetation which can be employed without the necessity of subsequent wax extracting operations.

A further object of the invention is to provide a method and apparatus capable of extracting a heretofore unrealized percentage of the wax from the wax-producing plant with a minimum of accompanying fine vegetable matter.

Still a further object of this invention is to provide an apparatus having satisfactory portability and roadability which will permit it to be moved about in wax-producing areas.

In an attempt to diminish the disintegration of leafy matter and, thereby to minimize the non-wax content in the wax powder, a beating principle, quite different to those heretofore employed, has been developed. By this principle, removal of the wax particles is achieved by means of compressed air jets impinging on the carnauba leaf. No slitting or cutting of the leaf is necessary since the air velocity is sufficient to blow the wax powder out of the crevices in the leaf. With such an arrangement, the powder is separated nearly quantitatively with very little destruction to the leaf.

The preferred embodiment of the invention will be described having reference to the accompanying drawings wherein the same reference characters have been used throughout for the designation of similar parts.

Fig. 6 is a diagrammatic view showing the manner by which the upper feed rolls are driven.

Figure 1:
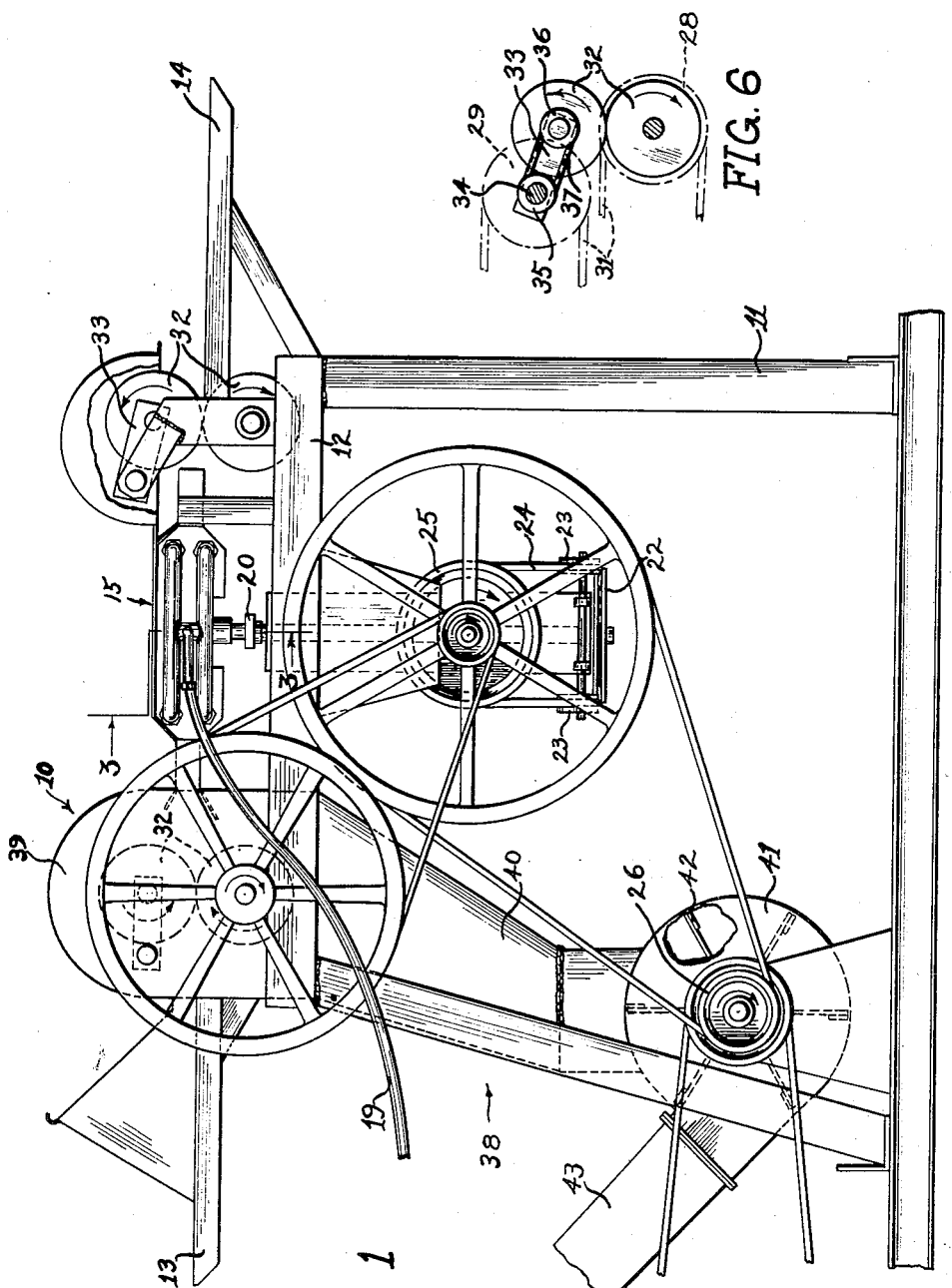
Fig. 1 is a side elevational view of the wax-stripping apparatus.

As shown in the accompanying drawings, the wax stripper of this invention, generally desginated by the numeral 10, may be divided into three portions, i. e., the propelling or leaf-driving section, the leaf-treating section and the wax-discharge section. It is supported by a frame assembly consisting of legs 11 and cross pieces 12. Superimposed on the frame assembly at each end is a table, the feed table being designated as 13, and the discharge table as 14.

Leaves placed on table 13 are driven by a series of rollers through the leaf-treating section, identified by the numeral 15, and pass through a plurality of slots 16. Each of the slots contains a series of reciprocating air jets emanating from tubes 17 through openings 18. Compressed air, supplied to the reciprocating tubes by a compressor, not shown, through flexible hose 19, produces a high velocity jet as it escapes through each opening. Tubes 17 reciprocate laterally to an extent sufficient to cause the jets to traverse substantially the entire width of slots 16.

Figure 2:
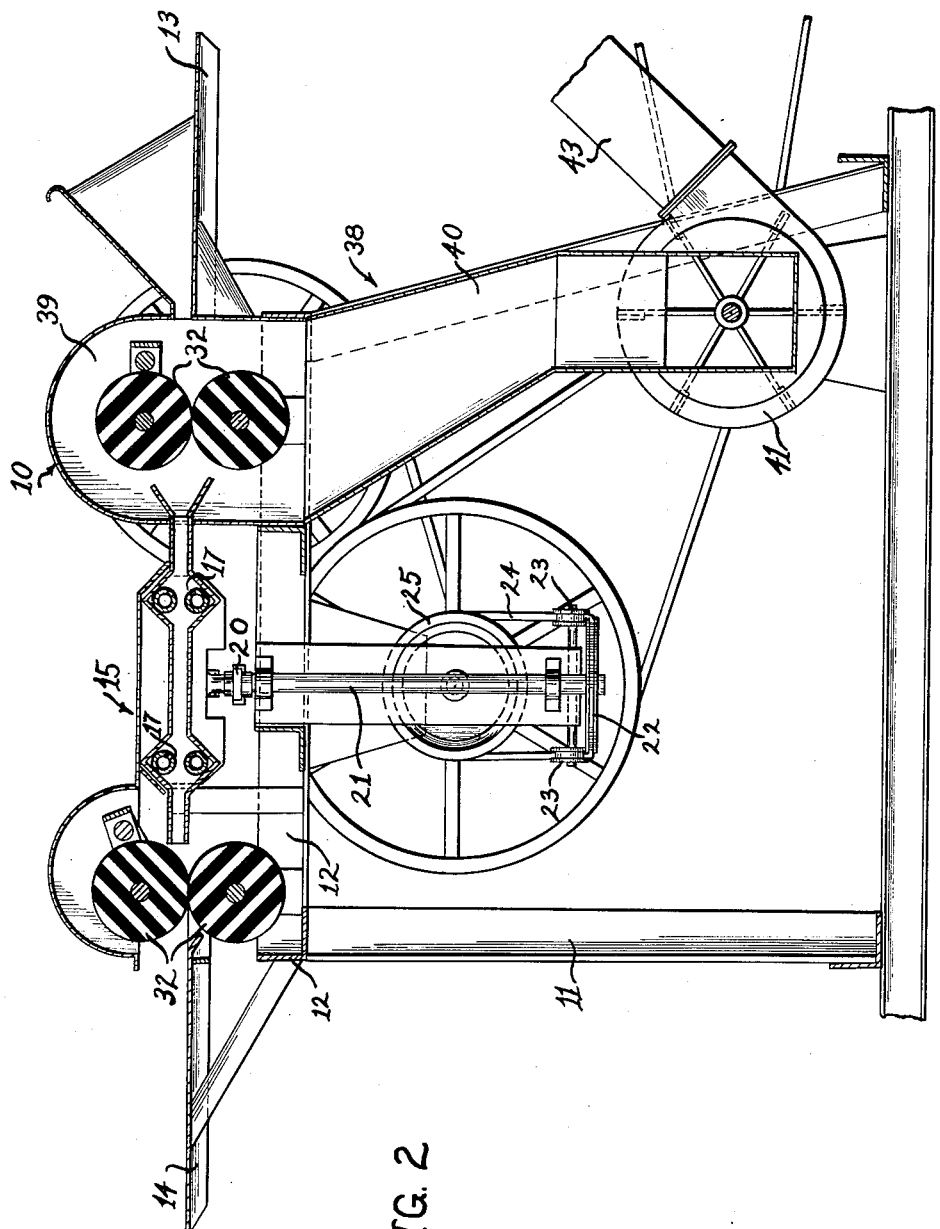
Fig. 2 is an axial section of Fig. 1 taken in reverse.
Figure 3:
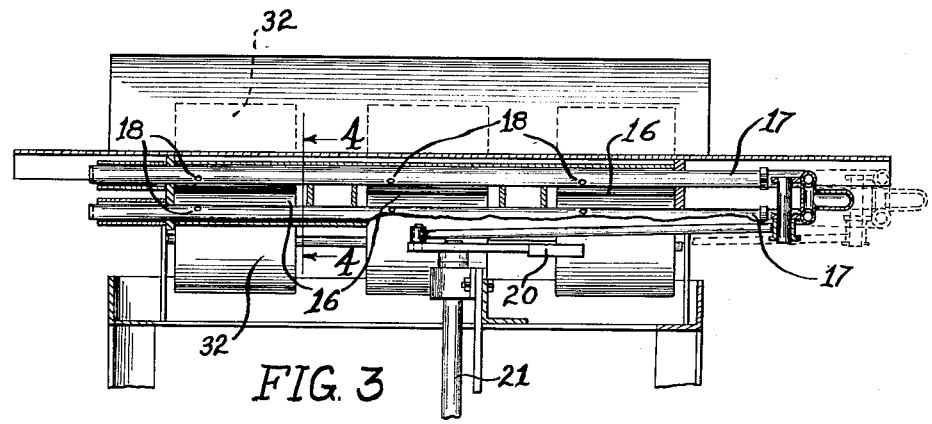
Fig. 3 is a transverse section taken along the line 3—3 in Fig. 1.

The reciprocation of tubes 17, best seen in Fig. 3 is achieved by means of crank 20 which is connected to the power source, not shown, through vertical shaft 21. As illustrated in Figs. 1 and 2, the latter is motivated by a right angle drive assembly consisting of horizontal pulley 22 and idler pulleys 23 which are driven through belt 24 by vertical pulley 25. Pulley 25, in turn, is coupled in a conventional manner to the main drive pulley 26 which is driven by a suitable source of power such as an electric or diesel motor. The motion of pulley 26 may be transmitted in any suitable manner to pulley 27 and thence to pulleys 28, 29 and 30, the latter four pulleys being interconnected by belt 31.

The propelling or leaf-driving section comprises, on either side of the leaf-treating section, one or more pair of cooperating rollers 32 disposed in contact one over the other, and adapted to propel leaves in slot 16 through the treating section. The lower rollers of each pair are driven by pulleys 27 and 28 through the shafts thereof.

Pulleys 29 and 30 drive the upper rollers of each pair by means of the drive assembly illustrated in Fig. 6 of the drawings. The upper rollers are adapted to be raised out of contact with the lower rollers by the passage of leaves therebetween, preventing the use of the same driving means as is employed for the lower rollers. For this purpose each upper roller is mounted between the arms of bail 33 which pivots about shaft 34. Shaft 34, being rotated by pulley 29, causes the rotation of each upper roller 32 by means of pulley 35, mounted on the shaft, pulley 36 attached to each roller, and belt 37 extending therebetween.

Figure 4:
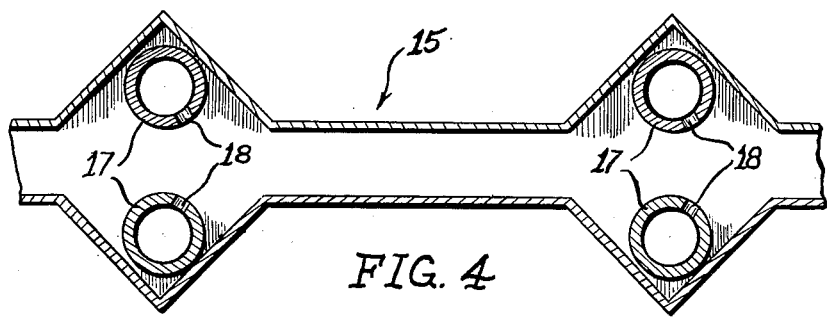
Fig. 4 is an enlarged section of the reciprocating tubes shown also in section in Fig. 2.
Figure 5:
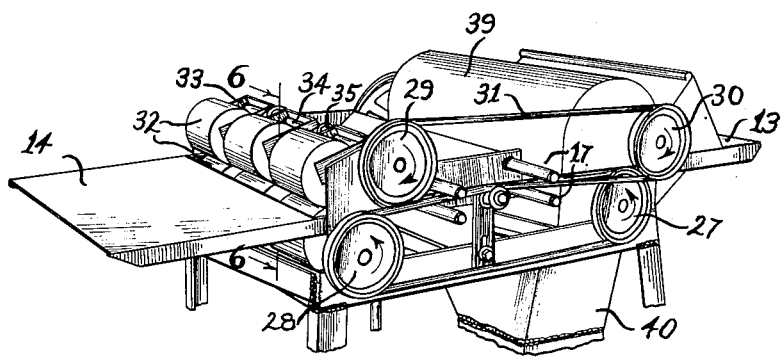
Fig. 5 is a perspective view of the wax-stripping apparatus showing the side opposite that depicted in Fig. 1.

Referring now to Fig. 4, it will be noted that openings 18 cause the air jets to impinge upon leaves passing therebetween at an angle of about 30° from the vertical. Such disposition of the openings together with the direction of travel of the leaves, which is substantially countercurrent to the air jets, provide the optimum air velocity. The reciprocation of the air jets results in a scrubbing action which tends to open up the folds of the leaf and entrain any powder lodged therein.

The wax-discharge section 38, which is positioned adjacent the feed end of the machine, comprises a hood 39 enclosing one set of cooperating drive rollers 32, and opening into tube 40 and thence to blower 41. In the blower, blades 42, driven by pulley 26, propel the wax powder, now suspended in an air stream, through pipe 43, to a cyclone dust collector not shown, where the entrained powder is separated from the air. The blower handles slightly more air than is fed into the machine by the jets, causing a slight internal vacuum. The effect of such vacuum is to create a good air stream from the treating zone through the discharge section. It also causes inflow of air at the leaf feed and discharge to minimize leakage of wax powder.

In operation, leaves to be treated are inserted butt-end first on table 13 through any one of the slots 16. A cooperating pair of rollers 32 at each end of each slot carries the leaves through the treating zone 15 where air jets blow the wax powder from the leaves toward wax discharge section 38. The leaves are discharged on table 14 by a second set of cooperating drive rollers and the wax particles entrained in air are removed from within hood 39 by means of exhaust blower 41. The wax powder may be separated from the air stream by any suitable means, such as a cyclone separator, and discharged into a suitable container.

It will be appreciated that the machine described hereinabove may be greatly modified without departing from the spirit of this invention. The depicted drive assembly comprises a conventional belt and pulley system, but the invention should by no means be restricted thereto, other means being equally suitable. The accompanying drawings illustrate three slots 16 through which the leaves are to travel, but it is contemplated that any number may be employed. Furthermore, if desired, any person skilled in the art may vary the number of reciprocating jet tubes without departing from the scope of the instant invention. It is therefore desired that only such limitations be imposed on the appended claims as are stated therein, or required by the prior art.

We claim:

1. A method of stripping wax powder from wax-containing vegetation comprising passing said vegetation through an enclosed chamber, impinging an air jet on said vegetation at a velocity sufficient to strip wax powder therefrom, said air jet moving across said vegetation as it passes through said chamber transversely to the direction of travel of said vegetation, entraining said powder in a stream of air, and removing said air-entrained wax powder from said chamber.

2. A method of stripping wax powder from wax-containing vegetation comprising passing said vegetation through an enclosed chamber, impinging an air jet on said vegetation at a velocity sufficient to strip wax powder therefrom, said air jet moving across said vegetation as it passes through said chamber transversely to the direction of travel of said vegetation, entraining said powder in a stream of air moving counter to the direction of travel of said vegetation, removing said air-entrained wax powder from said chamber, and separating said entrained powder from said air stream.

3. A method of stripping carnauba wax powder from carnauba palm leaves comprising passing a substantially whole palm leaf lengthwise through an enclosed chamber, impinging an air jet on said palm leaf at a velocity sufficient to strip wax powder therefrom, said air jet moving across said palm leaf as it passes through said chamber transversely to the direction of travel of said palm leaf, entraining said powder in a stream of air, and removing said air-entrained wax powder from said chamber.

4. A method of stripping carnauba wax powder from carnauba palm leaves comprising passing a substantially whole palm leaf lengthwise through an enclosed chamber, impinging an air jet on said palm leaf at a velocity sufficient to strip wax powder therefrom, said air jet moving across said palm leaf as it passes through said chamber transversely to the direction of travel of said palm leaf, entraining said powder in a stream of air, moving counter to the direction of travel of said palm leaf removing said air-entrained wax powder from said chamber, and separating said entrained powder from said air stream.

5. A stripper for removing wax powder from wax-containing palm leaves comprising a treating chamber opened at opposite ends, means disposed at one of said ends for gripping opposite sides of said palm leaves and operable to thrust said palm leaves into said treating chamber, additional means disposed at the other of said ends for gripping opposite sides of said palm leaves and operable to remove said palm leaves from said treating chamber, means for producing jets consisting of air to impinge on each of said sides of said palm leaves within said treating chamber, said means producing air jets having a velocity sufficient to separate wax powder from said palm leaves, and evacuating means for removing air and material suspended therein from said treating chamber, said evacuating means producing a movement of air within said treating chamber counter to the direction of travel of said leaves through said treating chamber.

6. A stripper for removing wax powder from wax-containing palm leaves comprising a treating chamber opened at opposite ends, means disposed at one of said ends for gripping opposite sides of said palm leaves and operable to thrust said palm leaves into said treating chamber, additional means disposed at the other of said ends for gripping opposite sides of said palm leaves and operable to remove said palm leaves from said treating chamber, air discharge means producing jets consisting of air which impinge on opposite sides of said palm leaves in said treating chamber with a velocity sufficient to separate wax powder from said palm leaves, means associated with said air discharge means operable to move said jets of air across said palm leaves transversely to the direction of travel of said palm leaves through said treating chamber, and evacuating means for removing air and material suspended therein from said treating chamber, said evacuating means producing a movement of air within said treating chamber counter to the direction of travel of said leaves through said treating chamber.

References Cited in the file of this patent

UNITED STATES PATENTS

| | | |
|---|---|---|
| 1,192,159 | Blauvelt et al. | July 25, 1916 |
| 1,517,596 | Stebbins | Dec. 2, 1924 |
| 1,753,902 | Nevills | Apr. 8, 1930 |
| 1,775,907 | Lorentz | Sept. 16, 1930 |
| 1,962,767 | Crowley et al. | June 12, 1934 |
| 2,276,594 | Rowell | Mar. 17, 1942 |
| 2,612,170 | Dudley | Sept. 30, 1952 |
| 2,701,408 | Borger | Feb. 8, 1955 |